United States Patent [19]

Fukuda

[11] Patent Number: 5,729,117
[45] Date of Patent: Mar. 17, 1998

[54] APPARATUS AND METHOD FOR CHARGING A PLURALITY OF BATTERIES USING A COMBINATION OF INDIVIDUAL AND PARALLEL CONNECTIONS

[75] Inventor: Motohiko Fukuda, Tokyo, Japan

[73] Assignee: Sony Corporation, Japan

[21] Appl. No.: 720,619

[22] Filed: Oct. 2, 1996

[30] Foreign Application Priority Data

Oct. 4, 1995 [JP] Japan ................... 7-257324

[51] Int. Cl.⁶ ................... H02J 7/021; H01M 10/44
[52] U.S. Cl. ................... 320/117; 320/162
[58] Field of Search ................... 320/7, 15, 16, 320/22, 30, 39, 40

[56] References Cited

U.S. PATENT DOCUMENTS

| | | | |
|---|---|---|---|
| 4,139,812 | 2/1979 | Huggins | 320/7 |
| 4,297,629 | 10/1981 | Gardard et al. | 320/7 |
| 4,849,682 | 7/1989 | Bauer et al. | 320/15 |
| 5,057,762 | 10/1991 | Goedken et al. | 320/15 |
| 5,229,705 | 7/1993 | Kato | 320/20 |
| 5,357,187 | 10/1994 | Park | 320/20 |
| 5,497,066 | 3/1996 | Drouillard et al. | 320/7 |
| 5,637,981 | 6/1997 | Nagai et al. | 320/22 |

*Primary Examiner*—Peter S. Wong
*Assistant Examiner*—Gregory J. Toatley, Jr.
*Attorney, Agent, or Firm*—Ronald P. Kananen

[57] ABSTRACT

Battery charging time is shortened. The control circuit 6 controls the switches 7-1 and 7-2 to charge the batteries 21-1 and 21-2 at a constant current one by one. Subsequently the batteries are charged one by one at a constant voltage until the charging current decreases to ½ a prescribed current. Next, the control circuit 6 turns the switches 7-1 and 7-2 on to charge simultaneously the batteries 21-1 and 21-2 in a parallel connection. After the charging current decreases to a prescribed current value, the batteries are charged at a constant voltage for a prescribed time. Then charging is completed.

5 Claims, 8 Drawing Sheets

F I G. 8
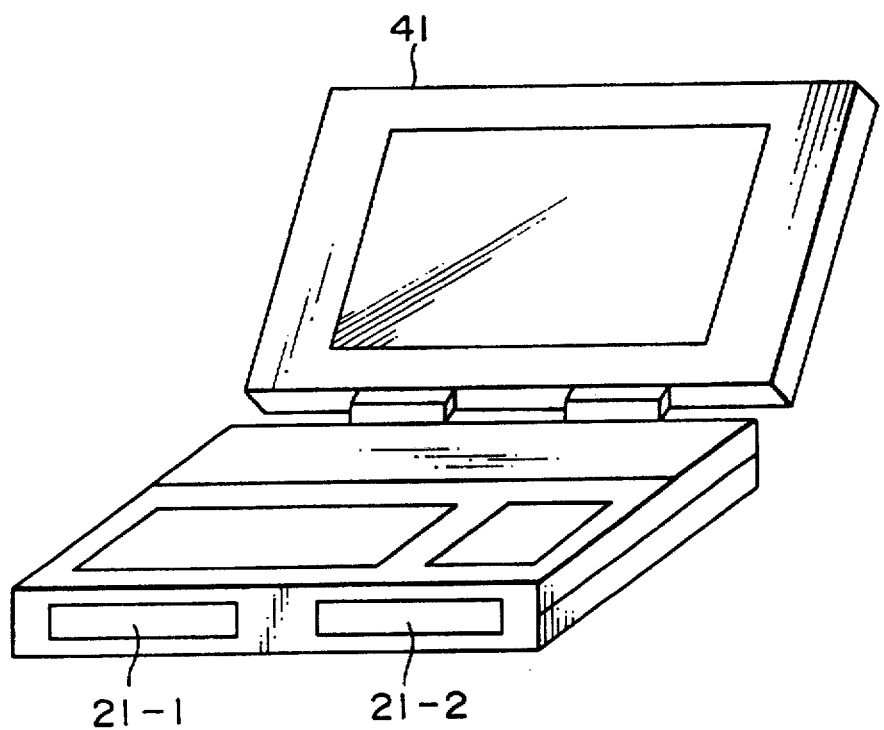

APPARATUS AND METHOD FOR CHARGING A PLURALITY OF BATTERIES USING A COMBINATION OF INDIVIDUAL AND PARALLEL CONNECTIONS

BACKGROUND OF THE INVENTION

1. Field of the Invention

This invention relates to an apparatus and method for battery charging. More particularly the present invention relates to an apparatus and method for battery charging, when a plurality of batteries are charged, batteries are charged one by one up to a prescribed charged level, thereafter the plurality of batteries are charged simultaneously in parallel connection.

2. Description of Related Art

FIG. 6 shows one example of the structure of a conventional battery charger. This example of the structure is provided with a rectifying smoothing circuit 1, a constant current circuit 2, and a constant voltage circuit 3. The rectifying smoothing circuit 1 rectifies and smooths AC power supplied from an AC power source and then supplies a current to the constant current circuit 2 and constant voltage circuit 3.

In the example of the structure, a battery is charged first at constant current and then charged at constant voltage according to a standard charging method as shown in FIG. 7.

First, the control circuit 6 is switched on to start charging. When the charging is started, the current detection circuit 4 measures charging current flowing into a secondary battery 21, the voltage detection circuit 5 measures the voltage of the battery 21, and both detection circuits 4 and 5 output the measured current and voltage to the control circuit 6. The control circuit 6 monitors the charging condition based on these values, and when the battery is fully charged, the control circuit 6 turns the switch 7 off.

When the voltage of the battery 21 is lower than a prescribed value at the start of the charging, the constant current circuit 2 is activated at a constant current which is considerably smaller than the prescribed value and initial charging is operated (during time period A in FIG. 7) for protection of the battery 21 and the charging circuit.

When charging voltage (voltage applied to the battery 21) increases to some level by initial charging, the constant current circuit 2 outputs a prescribed current and constant current charging occurs during time period B in FIG. 7).

When the charging voltage increases to a prescribed voltage during the constant current charging, the current value flowing into the battery 21 decreases, the charging is then switched from current constant charging to constant voltage charging automatically, and the constant voltage charging circuit 3 is principally responsible for charging. The constant voltage charging continues until the charging current decreases to a current value smaller than a prescribed current value. (time period in FIG. 7)

When the current detection circuit 4 detects that the charging current decreases to a value smaller than a prescribed current value, the current detection circuit 4 starts the constant voltage charging of a prescribed time period D (time period in FIG. 7), and when the time period is over, the entire charging process is complete.

As described above, when a single battery is charged, the battery is charged conventionally according to the standard charging method.

However, recently for example, in a portable personal computer 41 as shown in FIG. 8, circuit elements which consume electric power more than conventional elements are used widely used. To use such a Portable personal computer for a long time with power supplied from the battery system, a plurality of batteries are required unlike conventional devices requiring only single battery. In this situation, it is required that a plurality of batteries are charged (two batteries 21-1 and 21-2 in FIG. 8).

To charge a plurality of batteries (N batteries), simultaneous charging of a plurality (N) of batteries is considered. To realize such simultaneous charging, it is necessary that the charging circuit have a capacity for carrying a current N times a prescribed current for charging a single battery.

However, such a battery charger (and, therefore, Portable personal computers 41 in which such a charging circuit is built in) have problems such as large size and high cost.

Therefore, when N batteries are charged using a battery charger having an ordinal capacity (capacity for charging a single battery), N batteries are charged, one by one, N times according to the above mentioned standard charging method.

However, charging a plurality of batteries one by one as described herein above requires a long time. It is inconvenient and disadvantageous.

SUMMARY OF THE INVENTION

The present invention is accomplished for solving such problems. The present invention provides a apparatus and method for battery charging which are capable of charging a plurality of batteries with a prescribed current for charging a single battery within a short charging time without changing the scale of the charger.

The battery charger of the present invention is provided with a charging means for charging a plurality of batteries, a detection means for detecting a charging condition of the plurality of batteries, and a switching means for switching the connection condition between a plurality of batteries depending on the detection result of the detection means.

When a charging current of individual batteries decreases to a prescribed current value, the switching means switches from the condition in which a plurality of batteries are charged one by one to the condition in which the plurality of batteries are charged simultaneously in parallel connection.

The charging means charges dependently on the way in which connection condition of the plurality of batteries. The charging means charge the plurality of batteries one by one up to a prescribed charging level, and thereafter charge simultaneously the plurality of batteries in parallel connection.

The present invention is a method for charging a plurality of batteries which is capable of charging a plurality of batteries, detecting a charging condition of the plurality of batteries, and switching the connection condition of the plurality of batteries between the condition of charging the plurality of batteries one by one and the condition of charging the plurality of batteries simultaneously in parallel connection depending on the detection result of the charging condition.

As described above, according to the apparatus and method for battery charging of the present invention, when a plurality of batteries are charged, the charging condition of the batteries during charging is detected. The plurality of batteries are charged one by one until the charging level calculated based on the charging condition increases to a prescribed value. After the charging level increases to the prescribed value, the plurality of batteries are connected in parallel and are charged simultaneously, thus charging time is shortened.

BRIEF DESCRIPTION OF THE DRAWINGS

FIG. 8 is a diagram for illustrating a portable personal computer having a built-in battery charger.

DESCRIPTION OF THE PREFERRED EMBODIMENT

Figure 1:
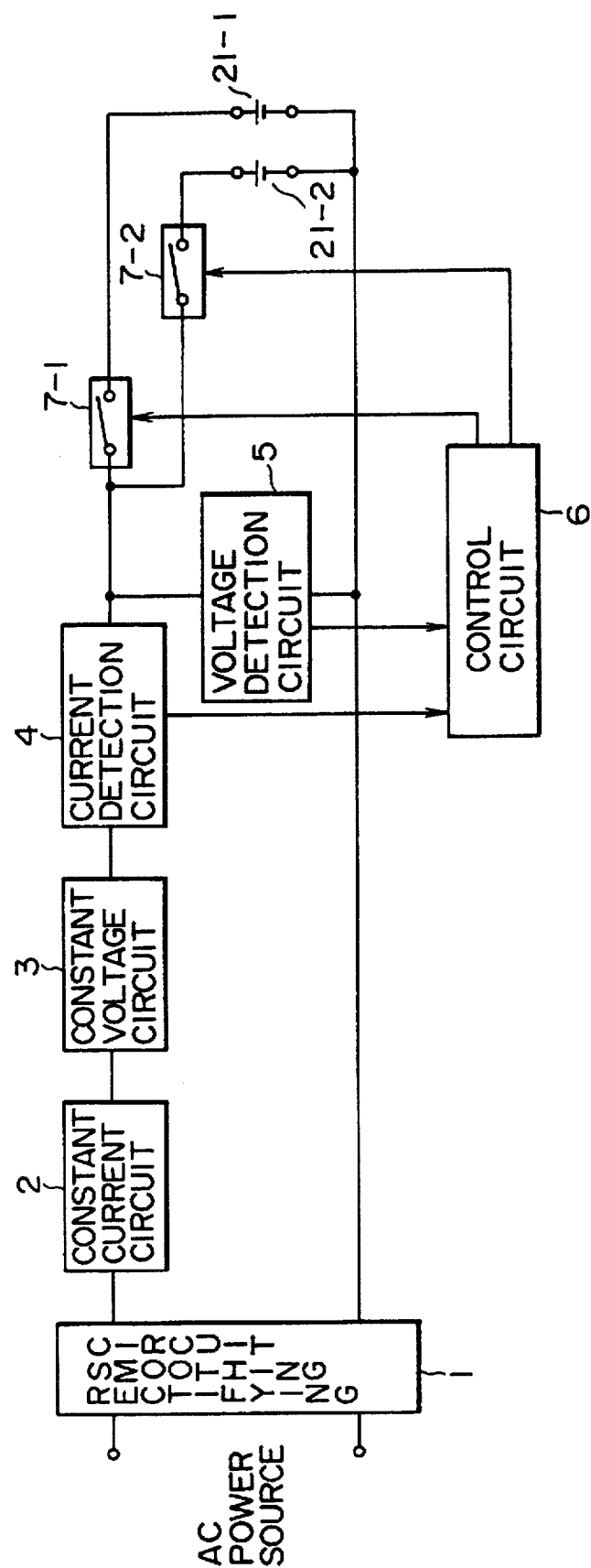
FIG. 1 is a block diagram for illustrating a structure of the first embodiment in accordance with the battery charger of the present invention.

FIG. 1 shown an example of a first embodiment of a battery charger in accordance with the present invention. The example is provided with a current detection circuit 4 (detection means), voltage detection circuit 5 (detection means), and two switches 7-1 and 7-2 (switching means). The current detection circuit 4 measures charging current flowing into a secondary battery 21-1 or secondary battery 21-2 comprising a secondary battery such as lithium ion battery which is being charged at that time, and outputs the current value to the control circuit 6. The voltage detection circuit 5 measures the charging voltage of the battery 21-1 or battery 21-2 which is being charged at that time, and outputs the voltage value to the control circuit 6.

The rectifying smoothing circuit 1 rectifies and smooths AC power supplied from an AC power source, then supplies power to the constant current circuit 2 (charging means) and the constant voltage circuit 3 (charging means). The constant current circuit 2 and constant voltage circuit 3 are operated as follows: the constant current circuit 2 is operated mainly when the charging voltage is low to output a constant current, and after the charging voltage becomes high, the constant voltage circuit 3 is mainly operated to charge at a constant voltage.

The control circuit 6 is connected to switches 7-1 and 7-2, and controls the switches 7-1 and 7-2 based on the charging current and the charging voltage measured by the current detection circuit 4 and voltage detection circuit 5 to select a battery to be charged. Further, the control circuit 6 monitors the charging condition of the battery being charged with the charging current value and charging voltage value, and when a battery becomes fully charged, the control circuit 6 turns the switches 7-1 and 7-2 off.

Figure 2:
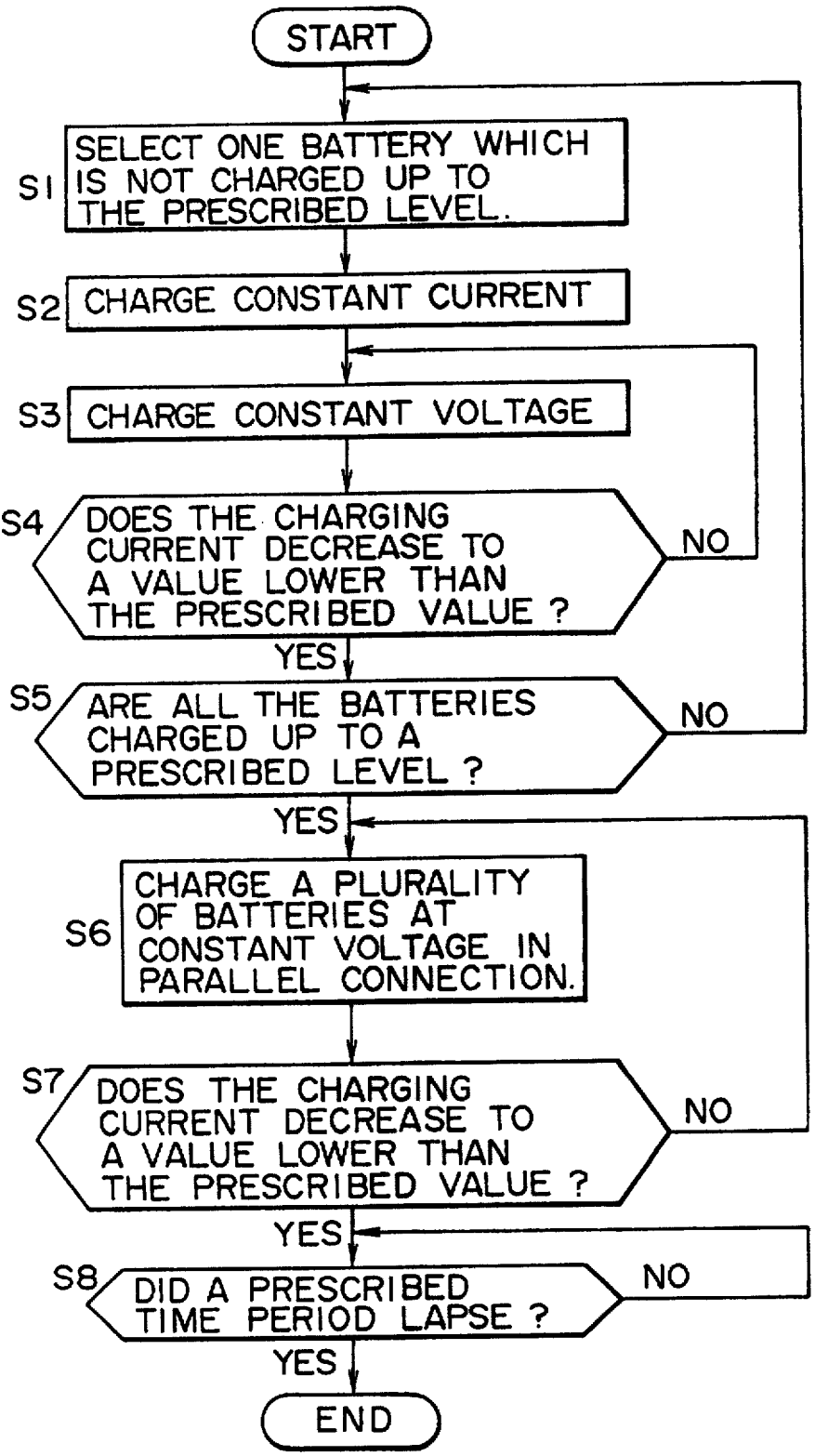
FIG. 2 is a flowchart for describing the operations of the embodiment shown in FIG. 1.
Figure 3:
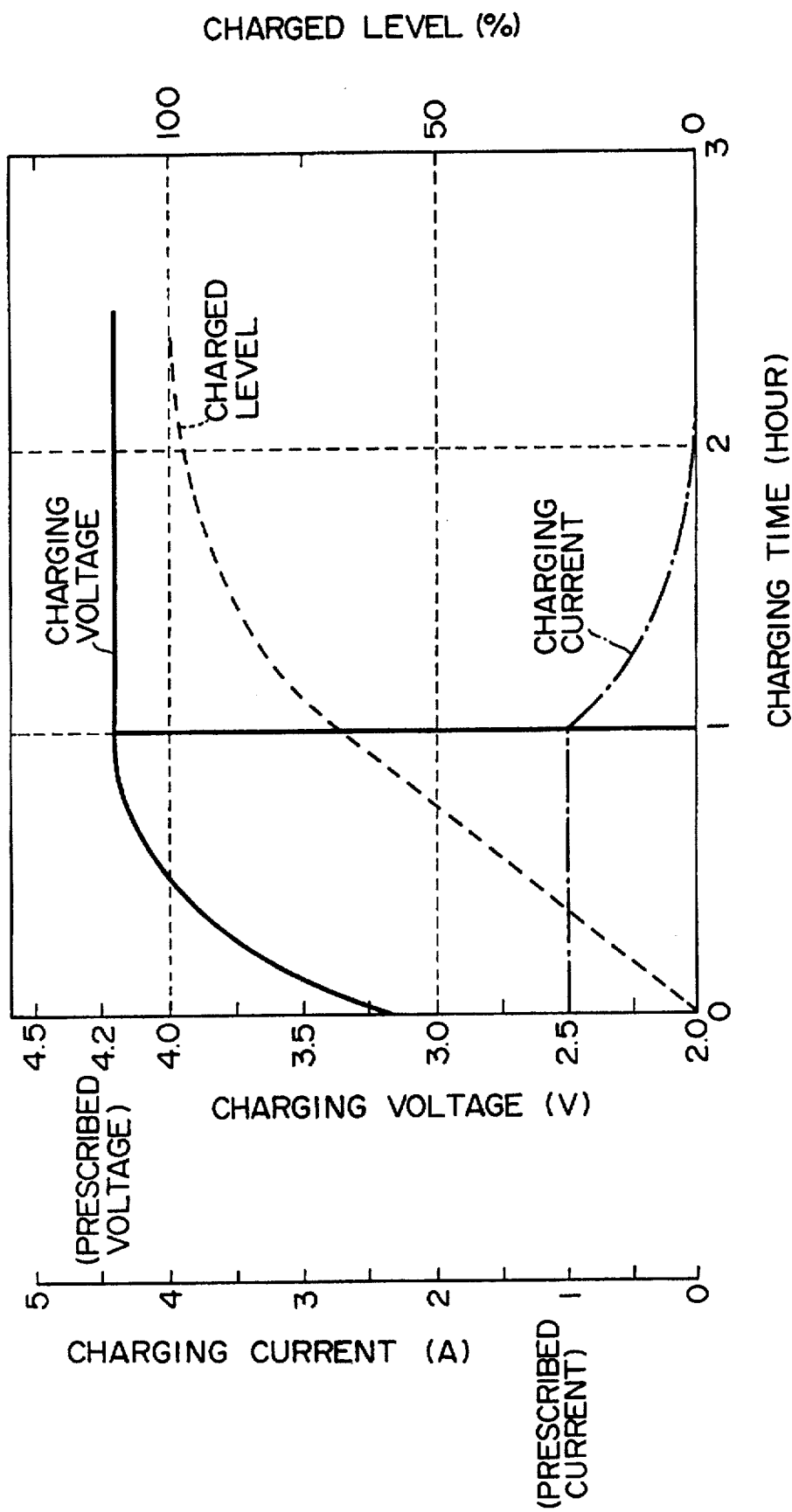
FIG. 3 is a graph for describing the charging characteristics of the batteries 21-1 and 21-2 in the embodiment shown in FIG. 1.

Next, operations of the embodiment shown in FIG. 1 are described referring to the flowchart shown in FIG. 2 and the charging characteristics curve shown in FIG. 3.

First in the step S1, the control circuit 6 selects one battery which is not charged up to a prescribed level out of the batteries of 21-1 and 21-2. Herein, both batteries 21-1 and 21-2 are not charged, then the control circuit 6 turns the switch 7-1 on and the switch 7-2 off to select the battery 21-1.

Next, in the step S2, charging is started to the selected battery 21-1, and the constant current circuit 2 outputs a prescribed current (1 ampere in FIG. 3). Until the charging voltage increases to a prescribed voltage (4.2 volts in FIG. 3), the battery is charged at a constant current. As charging proceeds to increase charging voltage, the current value flowing into the battery 21-1 decreases gradually and the constant current charging becomes difficult. As a result, the charging is switched to the constant voltage charging automatically in the step S3. The constant voltage circuit 3 is activated to start constant voltage charging.

In the step S4, the control circuit 6 determines whether the charging current value supplied from the current detection circuit 4 has decreased to a value lower than a prescribed reference value. If the charging current is higher than the reference value, the process returns to the step S3, and the constant voltage charging is continued. If the charging current is lower than the reference value, the process proceeds to the step S5.

In this example, because two batteries 21-1 and 21-2 are charged, constant voltage charging is continued until the charging current decreases to ½ the prescribed current value (in FIG. 3, 0.5 ampere=1 ampere/2) so that the total charging current does not exceed the prescribed current value (in FIG. 3, 1 ampere) when two batteries are charged simultaneously thereafter.

In the step S5, whether all the batteries are charged up to the prescribed level (whether the charging current decreases to ½ the prescribed current value in the constant voltage charging) is determined, and if all the batteries are charged up to the prescribed level, the process proceeds to the step S6. If any battery is not charged up to the prescribed level, the process returns to the step S1, and the processes from the step S1 to the step S5 is repeated.

Herein, because the battery 21-2 is not charged to the prescribed level, the process returns to the step S1, the control circuit 6 turns the switch 7-1 off, and the switch 7-2 on to select the battery 21-2. Thereafter the process from step S2 to step S5 is repeated.

After two batteries 21-1 and 21-2 are charged up to the prescribed level, in the step S6, the control circuit 6 turns both switches 7-1 and 7-2 on to connect these batteries in parallel, and both batteries are charged simultaneously at a constant voltage. When, though a current which is double that for one battery flows, both batteries have been charged already up to the level at which charging current has decreased to ½ prescribed the charging current. Therefore, the current flow exceeding the capacity of the constant current circuit 2 is prevented.

In the step S7, whether the charging current has decreased to a value lower than the prescribed value is determined. If the charging current is higher than the prescribed value, the process returns to the step S6 to continue the charging. When the charging current decreases to a value lower than the prescribed value, the process proceeds to the step S8, and the constant voltage charging is continued for a prescribed time period. When the prescribed time period has lapsed, the charging is brought to a stop.

For judging in step S7, the control circuit 6 compares ½ the value of the detected output of the current detection circuit 4 with the prescribed value. Naturally, when the current detection circuit 4 is connected at the position which allows the current detection circuit 4 to detect separately charging currents of the batteries 21-1 and 21-2, it is not the case.

As described herein above, using only one charging circuit, a plurality of batteries are charged one by one to the half level, and thereafter the plurality of batteries are charged simultaneously in parallel connection.

Next, the time required for charging two batteries having charging characteristics shown in FIG. 3 is calculated.

As Shown in FIG. 3, the time required for charging one battery, that is, a battery that is charged at a constant current and then charged at a constant voltage until the charging current decreases to ½ a prescribed current, namely, 0.5 ampere, is about 1 hour and 20 minutes. Therefore, it takes 2 hours and 40 minutes (=1 hour and 20 minutes×2) to charge two batteries to the same charged level when two batteries are charged one by one.

Next, the two batteries which had charged for 1 hour and 20 minutes individually are connected in parallel, and charged simultaneously up to 100% charged level. As shown in FIG. 3, it takes 2 hours and 30 minutes to charge continuously one battery up to the charged level of 100%, therefore in the case that one battery is charged already for 1 hour and 20 minutes, it takes 1 hour and 10 minutes (=2 hours and 30 minutes−1 hour and 20 minutes) for additional charging up to the charged level of 100%. When two batteries are charged in parallel connection, because these two batteries are connected in parallel, it takes 1 hour and 10 minutes to charge these two batteries up to the charged level of 100% like charging of one battery.

Therefore, in this embodiment, the time required for charging two batteries up to the charged level of 100% is 3 hours and 50 minutes (=2 hours and 40 minutes+1 hour and 10 minutes). On the other hand, the time required for charging these two batteries one by one up to the charged level of 100% is 5 hours (2 hours and 30 minutes×2). It is obvious that the charging time for the above-mentioned embodiment is shorter than one by one charging.

Figure 4:
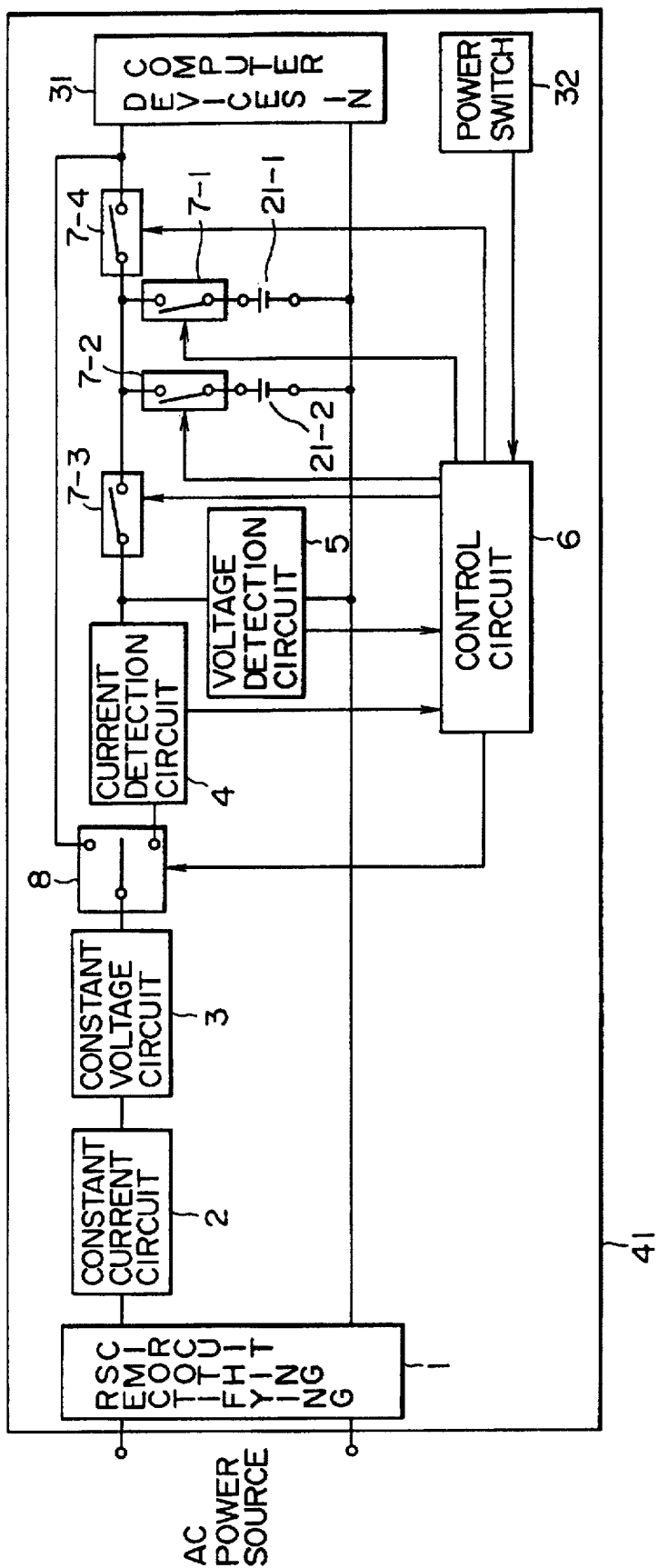
FIG. 4 is a block diagram for illustrating a structure of the second embodiment in accordance with the battery charger of the present invention.

FIG. 4 shows the structure of a second embodiment of a charger of the present invention. In this embodiment, batteries 21-1 and 21-2 and a charging circuit for charging the batteries are built in a portable personal computer 41 as shown in FIG. 8. This structural example is provided with a control circuit 6 and changeover switch 8. The control circuit 6 controls switches 7-1 and 7-2 based on charging current value and charging voltage value detected by a current detecting circuit 4 and voltage detecting circuit 5, charges two batteries 21-1 and 21-2 one by one at a constant current, and charges the two batteries 21-1 and 21-2 up to the charged level of ½ the prescribed current value, thereafter and charges the two batteries 21-1 and 21-2 simultaneously in parallel connection.

When the charger is connected to an AC power source in the portable personal computer 41 and an operator turns the power switch 32 on, the control circuit 6 operates connections described herein. First, a switch 7-4 is turned off to disconnect the batteries 21-1 and 21-2 from the computer internal devices 31. Next, changeover switch 8 is switched to the computer internal devices 31 to bypass the charging circuit, and power is supplied directly from AC power source to the computer internal devices 31.

When the charger is not connected to the AC power source and an operator turns the power switch 32 on, the control circuit 6 operates connections described herein. The changeover switch 8 is connected to the charging circuit side (current detecting circuit 4). Control circuit 6, and turns the switch 7-3 off, and turns switches 7-1, 7-2, and 7-4 on. The batteries 21-1 and 21-2 are connected to the computer internal devices 31. The batteries 21-1 and 21-2 supply power to the computer internal devices 31.

When the charger is connected to the AC power source and an operator turns the power switch 32 off, the control circuit 6 switches the changeover switch 8 to the charging circuit side, turns the switch 7-3 on, and the switch 7-4 off to start charging of the batteries 21-1 and 21-2.

Figure 5:
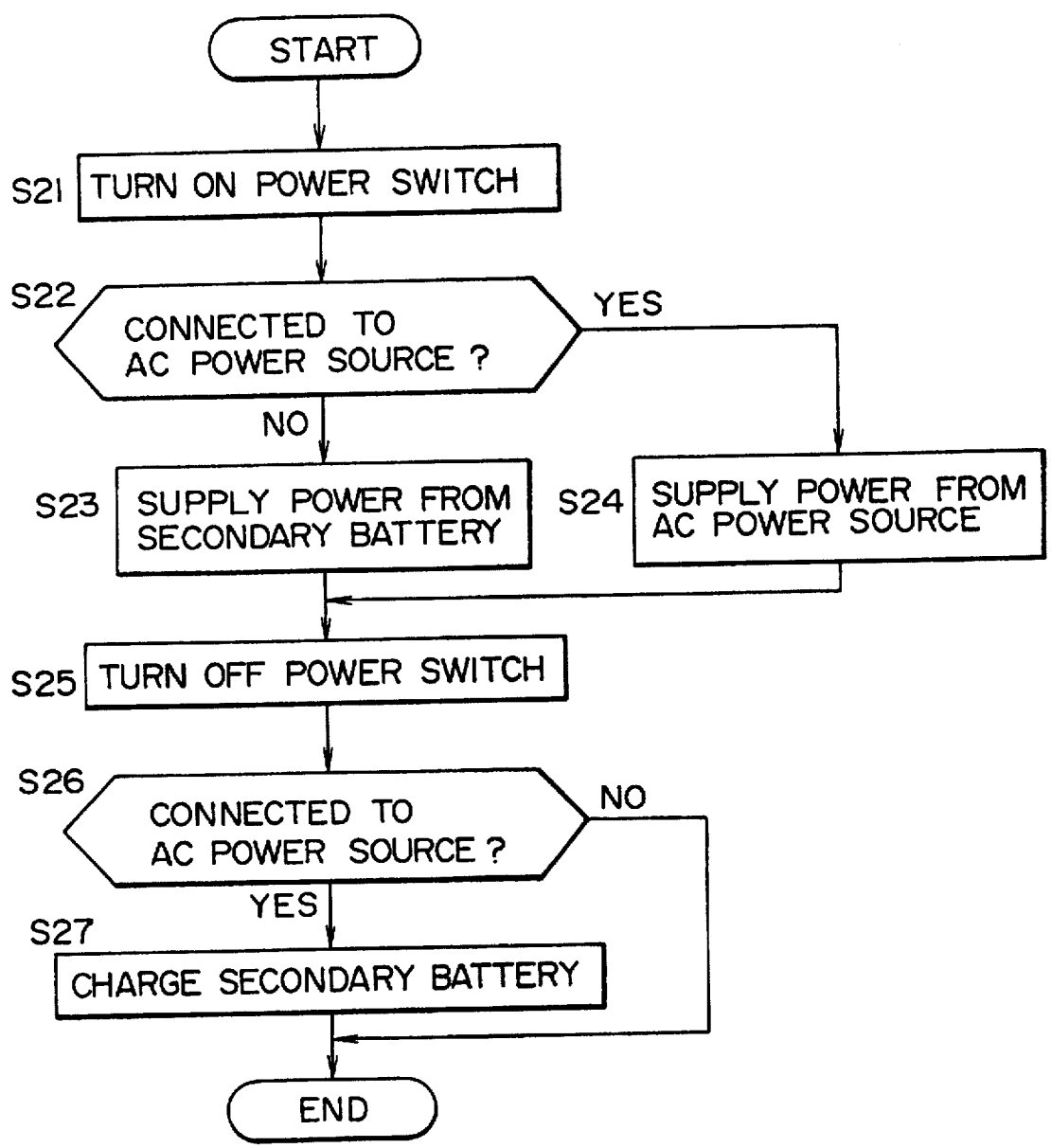
FIG. 5 is a flowchart for describing the operations of the embodiment shown in FIG. 4.
Figure 6:
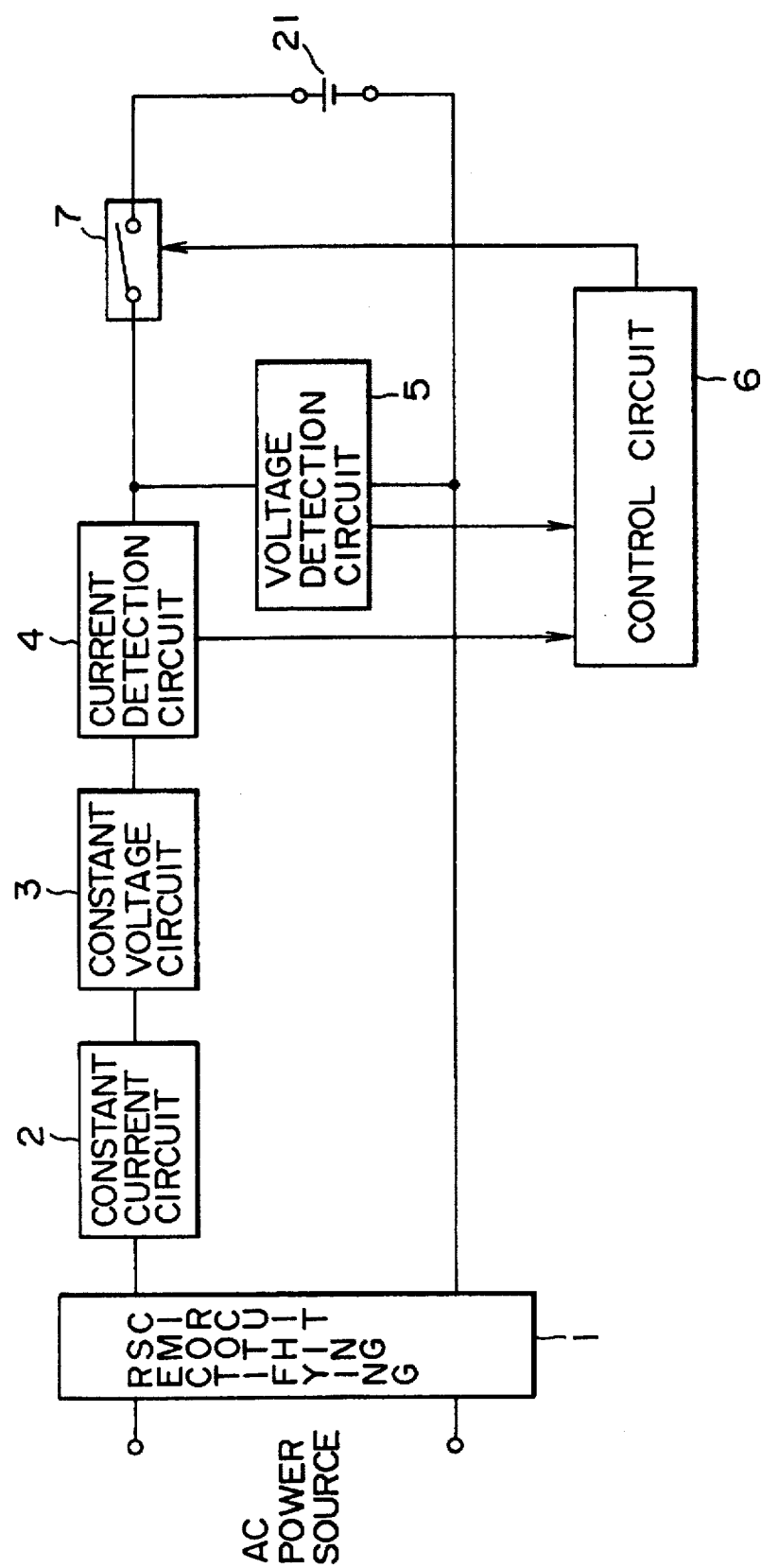
FIG. 6 is a block diagram for illustrating a structure of a conventional battery charger.
Figure 7:
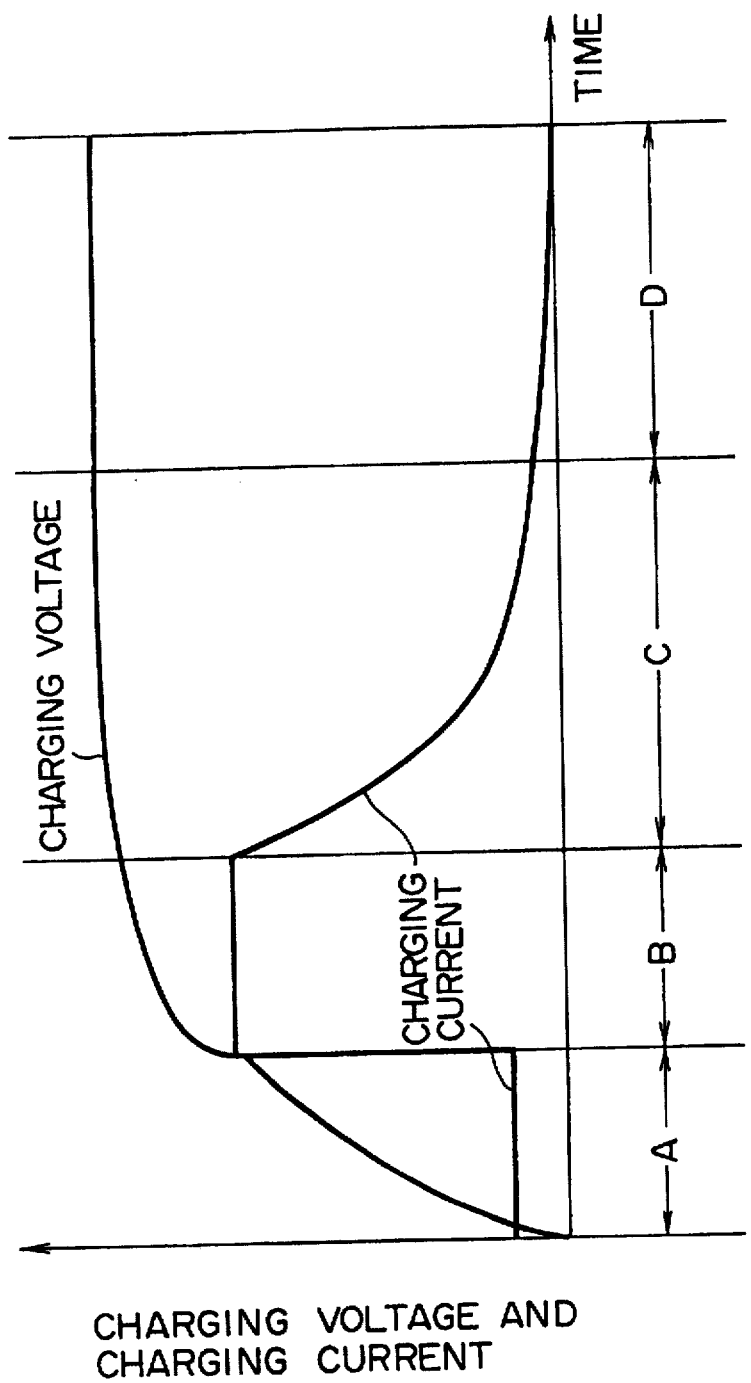
FIG. 7 is a graph for describing the characteristics of standard battery charging for the conventional battery charger.

Next, operations of the second embodiment of the present invention will be described referring to a flowchart shown in FIG. 5.

First in the step S21, an operator turns the power switch 32 of the portable personal computer 41 on. Next in the step S22, the control circuit 6 determines whether the charger is connected to the AC power source. If the determination is YES, the changeover switch 8 is switched to the computer internal devices 31 side in the step S24 to supply directly power from the AC power source to the computer internal devices 31.

If the charger is not connected to the AC power source, the control circuit 6 switches the changeover switch 8 to the charging circuit side and turns the switch 7-3 off, and switches 7-1, 7-2 and 7-4 on in the step S23. The batteries 21-1 and 21-2 are connected to the computer internal devices 31, and power in the batteries 21-1 and 21-2 is supplied to the computer internal devices 31. If the charger is not connected to the AC power source, processing of the step S27 is skipped because the batteries can not be charged.

After use of the portable personal computer 41 by an operator, when the power switch 32 is turned off in the step S25, the control circuit 6 determines whether the charger is connected to the AC power source in the step S26. If the charger is connected to the AC power source, the control circuit 6 switches the changeover switch 8 to the charging circuit side, and turns the switch 7-3 on and switch 7-4 off for charging in the step S27.

In the step S27, the batteries 21-1 and 21-2 are charged one by one at a constant current, subsequently charged at a constant voltage up to ½ the prescribed current. Then the two batteries are charged simultaneously in parallel connection as in the same manner as described in the first embodiment.

As described, the power source is selected and charging is started automatically without manual operation by structuring the portable personal computer so that the control circuit 6 controls the changeover switch 8 and the switches 7-1 to 7-4.

In the embodiments described, two batteries are charged, however three or more (N batteries) batteries can be charged. In such a case, the first N batteries are charged one by one at a constant current, then charged one by one at a constant voltage until charging current decreases to 1/N of the prescribed charging current. Thereafter the N batteries are connected in parallel and charged simultaneously. Thereby, the charging current is maintained below the prescribed charging current value through the whole charging process. Therefore, N batteries are charged using only one charging circuit.

Generally the charged level increases rapidly in the initial stage of the charging. Therefore, when the charging process is interrupted for some reason, the total charge by the embodiment of the present invention will be higher than the total charge achieved by charging each battery up to the charged level of 100% one by one.

Batteries are charged as shown in FIG. 3, for example, when the charging is interrupted after 2 hours. In this embodiment, one battery is charged to the charged level of 87% (1 hour and 20 minutes) and the other battery is charged up to the charged level of 43% (40 minutes). On the other hand, in the case that batteries are charged one by one up to the charged level of 100%, one battery is charged to the charged level of 98% (2 hours), and the other battery is not charged at all (0 hour).

Further, when charging is intermitted interrupted during charging of two batteries in parallel connection, charging the voltage is equal for both, therefore use of both batteries in parallel a connection as a power source results in less problem.

What is claimed is:

1. A battery charger for charging a plurality of batteries provided with;

charging means for charging a plurality of batteries, detecting means for detecting charging condition of the plurality of batteries, and switching means for switching the connection condition of said plurality of batteries to (a) the condition in which said plurality of batteries are charged one by one, or (b) the condition in which said plurality of batteries are charged simultaneously in parallel connection, correspondingly to the detected result of said detecting means.

2. The battery charger as claimed in claim 1, wherein said charging means is provided with a constant current means for charging said batteries at a constant current and a constant voltage means for charging said batteries at a constant voltage, and said switching means switches the connection of said plurality of batteries to parallel connection when individual charging currents of said plurality of batteries decrease to a prescribed current value.

3. The battery charger as claimed in claim 2, wherein, when said charging means charging N batteries, said prescribed current value of charging current is 1/N the constant current value for charging during said constant current charging.

4. The battery charger as claimed in claim 1, wherein said batteries are lithium ion batteries.

5. A method for charging a plurality of batteries comprising a series of steps;

a step for detecting the charging condition of said it of batteries, a step for switching the connection of said plurality of batteries to (a) the condition in which said plurality of batteries are charged one by one, or (b) the condition in which said plurality of batteries are charged simultaneously in parallel connection, correspondingly to the detected result of said charging condition.

* * * * *